United States Patent
Kumar et al.

(10) Patent No.: US 11,281,485 B2
(45) Date of Patent: Mar. 22, 2022

(54) EXTENDED CONTEXT DELIVERY FOR CONTEXT-BASED AUTHORIZATION

(71) Applicant: Nicira, Inc., Palo Alto, CA (US)

(72) Inventors: Vasantha Kumar, Tamil Nadu (IN); Prasad Sharad Dabak, Pune (IN); Azeem Feroz, San Jose, CA (US); Amit Vasant Patil, Pune (IN)

(73) Assignee: NICIRA, INC., Palo Alto, CA (US)

( * ) Notice: Subject to any disclaimer, the term of this patent is extended or adjusted under 35 U.S.C. 154(b) by 307 days.

(21) Appl. No.: 16/403,363

(22) Filed: May 3, 2019

(65) Prior Publication Data
US 2019/0266004 A1    Aug. 29, 2019

Related U.S. Application Data

(62) Division of application No. 15/016,216, filed on Feb. 4, 2016, now Pat. No. 10,324,746.

(30) Foreign Application Priority Data

Nov. 3, 2015  (IN) ............................ 5946/CHE/2015

(51) Int. Cl.
*H04L 29/06* (2006.01)
*G06F 9/455* (2018.01)
(Continued)

(52) U.S. Cl.
CPC .......... *G06F 9/45558* (2013.01); *G06F 21/53* (2013.01); *G06F 21/629* (2013.01);
(Continued)

(58) Field of Classification Search
CPC .... G06F 9/45558; G06F 21/629; G06F 21/53; G06F 2221/2141; G06F 2221/2105;
(Continued)

(56) References Cited

U.S. PATENT DOCUMENTS 5,826,051 A   10/1998 Porter et al.
5,950,195 A    9/1999 Stockwell et al.
(Continued)

FOREIGN PATENT DOCUMENTS

EP    2748750 A1    7/2014
JP    2016514295 A  5/2016
(Continued)

OTHER PUBLICATIONS

Author Unknown, "Cisco Identity-Based Firewall Security," Month Unknown 2011, 2 pages, Cisco Systems, Inc.
(Continued)

*Primary Examiner* — Baotran N To
(74) *Attorney, Agent, or Firm* — Adeli LLP

(57) ABSTRACT

Some embodiments provide a novel method for authorizing network requests for a machine in a network. In some embodiments, the method is performed by security agents that execute on virtual machines operating on a host machine. In some embodiments, the method captures a network request (e.g., network control packets, socket connection request, etc.) from a primary application executing on the machine. The method identifies an extended context for the network request and determines whether the network request is authorized based on the extended context. The method then processes the network request according to the determination. The extended context of some embodiments includes identifications for primary and secondary applications associated with the network request. Alternatively, or conjunctively, some embodiments include identifications for primary and secondary users associated with the network request.

20 Claims, 9 Drawing Sheets

(51) Int. Cl.
*G06F 21/53* (2013.01)
*G06F 21/62* (2013.01)

(52) U.S. Cl.
CPC ........ *H04L 63/0227* (2013.01); *H04L 63/102* (2013.01); *H04L 63/20* (2013.01); *G06F 2009/45587* (2013.01); *G06F 2009/45595* (2013.01); *G06F 2221/2105* (2013.01); *G06F 2221/2117* (2013.01); *G06F 2221/2141* (2013.01); *H04L 63/104* (2013.01)

(58) Field of Classification Search
CPC ... G06F 2221/2117; G06F 2009/45587; G06F 2009/45595; H04L 63/0227; H04L 63/102; H04L 63/20; H04L 63/104
See application file for complete search history.

(56) References Cited

U.S. PATENT DOCUMENTS

| | | |
|---|---|---|
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,418,249 B1 | 4/2013 | Nucci et al. |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,912,699 B1 | 3/2018 | Hebbar et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 | 7/2018 | Sengupta et al. |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 10,715,607 B2 | 7/2020 | Poon et al. |
| 10,778,651 B2 | 9/2020 | Gunda et al. |
| 10,798,058 B2 | 10/2020 | Sengupta et al. |
| 10,802,857 B2 | 10/2020 | Gunda et al. |
| 10,802,858 B2 | 10/2020 | Gunda |
| 10,802,893 B2 | 10/2020 | Chanda et al. |
| 10,803,173 B2 | 10/2020 | Gunda et al. |
| 10,805,332 B2 | 10/2020 | Gunda et al. |
| 10,812,451 B2 | 10/2020 | Gunda et al. |
| 10,862,773 B2 | 12/2020 | Chanda et al. |
| 10,938,837 B2 | 3/2021 | Kumar et al. |
| 11,032,246 B2 | 6/2021 | Gunda et al. |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2006/0109852 A1 | 5/2006 | Hadjiahmad et al. |
| 2007/0061492 A1 | 3/2007 | Riel |
| 2007/0101432 A1 | 5/2007 | Carpenter |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0265414 A1 | 10/2009 | Bryan |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0126196 A1 | 5/2011 | Cheung et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0158626 A1 | 6/2012 | Zhu et al. |
| 2012/0207174 A1 | 8/2012 | Shieh |
| 2012/0210423 A1 | 8/2012 | Friedrichs et al. |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |

(56) References Cited

U.S. PATENT DOCUMENTS

| | | |
|---|---|---|
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0143863 A1 | 5/2014 | Deb et al. |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1* | 7/2014 | Litty ............... G06F 21/53 713/193 |
| 2014/0226820 A1 | 8/2014 | Chopra et al. |
| 2014/0230008 A1* | 8/2014 | Feroz ............ H04L 63/166 726/1 |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0009995 A1 | 1/2015 | Gross, IV et al. |
| 2015/0012964 A1 | 1/2015 | Xie et al. |
| 2015/0067818 A1 | 3/2015 | Molander et al. |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0229656 A1 | 8/2015 | Shieh |
| 2015/0269383 A1 | 9/2015 | Lang et al. |
| 2015/0281073 A1 | 10/2015 | Kotha et al. |
| 2015/0350807 A1 | 12/2015 | Andrews et al. |
| 2015/0358231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057014 A1 | 2/2016 | Thakkar et al. |
| 2016/0057167 A1 | 2/2016 | Bach |
| 2016/0065456 A1 | 3/2016 | Muley et al. |
| 2016/0072669 A1 | 3/2016 | Saavedra |
| 2016/0087905 A1 | 3/2016 | Liu et al. |
| 2016/0119194 A1 | 4/2016 | Lopez et al. |
| 2016/0142287 A1 | 5/2016 | Yang et al. |
| 2016/0173329 A1 | 6/2016 | Latham et al. |
| 2016/0191413 A1* | 6/2016 | Feroz ............ H04L 63/0876 709/229 |
| 2016/0191521 A1* | 6/2016 | Feroz ............ H04L 63/20 726/1 |
| 2016/0212167 A1 | 7/2016 | Dotan et al. |
| 2016/0224789 A1 | 8/2016 | Feroz et al. |
| 2016/0226700 A1 | 8/2016 | Zhang et al. |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0315864 A1 | 10/2016 | Tan et al. |
| 2016/0330138 A1 | 11/2016 | Thomason |
| 2016/0337236 A1 | 11/2016 | Hsu et al. |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0118241 A1 | 4/2017 | Call et al. |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0212788 A1 | 7/2018 | Iszlai et al. |
| 2018/0212818 A1 | 7/2018 | Ide et al. |
| 2018/0241761 A1 | 8/2018 | Bania et al. |
| 2018/0351912 A1 | 12/2018 | Sengupta et al. |
| 2019/0034454 A1 | 1/2019 | Gangumalla et al. |
| 2019/0036956 A1 | 1/2019 | Gunda et al. |
| 2019/0075052 A1 | 3/2019 | Chirreddy et al. |
| 2019/0149525 A1 | 5/2019 | Gunda et al. |
| 2019/0235934 A1 | 8/2019 | Chanda et al. |
| 2019/0238429 A1 | 8/2019 | Chanda et al. |
| 2019/0394302 A1 | 12/2019 | Kristiansson et al. |
| 2020/0014662 A1 | 1/2020 | Chanda et al. |
| 2020/0036608 A1 | 1/2020 | Chanda et al. |
| 2020/0225978 A1 | 7/2020 | Feroz et al. |
| 2020/0364074 A1 | 11/2020 | Gunda et al. |
| 2021/0036990 A1 | 2/2021 | Sengupta et al. |
| 2021/0081461 A1 | 3/2021 | Zhou et al. |
| 2021/0218758 A1 | 7/2021 | Jain et al. |

FOREIGN PATENT DOCUMENTS

| | | |
|---|---|---|
| WO | 2008095010 A1 | 8/2008 |
| WO | 2013074828 A1 | 5/2013 |
| WO | 2014126574 A1 | 8/2014 |
| WO | 2016161799 A1 | 10/2016 |
| WO | 2018044352 A1 | 3/2018 |
| WO | 2018106612 A1 | 6/2018 |
| WO | 2018118465 A1 | 6/2018 |

OTHER PUBLICATIONS

Author Unknown, "Enabling Service Chaining on Cisco Nexus 1000V Series," Month Unknown, 2012, 25 pages, Cisco.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Brownlee, N., et al., "Traffic Flow Measurement: Architecture," RFC 2722, Oct. 1999, 48 pages, The Internet Society.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011, 17 pages, Spring-Verlag, London, UK.

(56) References Cited

OTHER PUBLICATIONS

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages.

Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Johnson, Maritza L., et al., "Laissez-faire File Sharing: Access Control Designed for Individuals at the Endpoints," NSPW '09: Proceedings of the 2009 Workshop on New Security Paradigms Workshop, Sep. 8-11, 2009, 9 pages, ACM, Oxford, United Kingdom.

Non-Published Commonly Owned U.S. Appl. No. 16/833,532, filed Mar. 28, 2020, 48 pages, Nicira, Inc.

Non-Published Commonly Owned U.S. Appl. No. 17/063,415, filed Oct. 5, 2020, 35 pages, Nicira, Inc.

\* cited by examiner

EXTENDED CONTEXT DELIVERY FOR CONTEXT-BASED AUTHORIZATION

CLAIM OF BENEFIT TO PRIOR APPLICATIONS

This application is a divisional application of U.S. patent application Ser. No. 15/016,216, filed Feb. 4, 2016, now published as U.S. Patent Publication 2017/0126677. U.S. patent application Ser. No. 15/016,216 claims the benefit of Indian Patent Application 5946/CHE/2015, filed Nov. 3, 2015. U.S. patent application Ser. No. 15/016,216, now published as U.S. Patent Publication 2017/0126677, is hereby incorporated by reference.

BACKGROUND

As networks expand, it becomes increasingly difficult to manage and maintain network policies for the different machines of the network. Various security applications are used to provide security for a network, including firewalls, antivirus and malware detection, etc.

Firewalls are used to enforce network security policies by monitoring and controlling network traffic. Many firewalls filter the network traffic based on various characteristics of the network traffic (e.g., port information, source/destination address information, etc.). Some firewalls perform deep packet inspection to further analyze the contents of the network traffic to identify applications or protocols used by the network traffic (e.g., Hypertext Transfer Protocol (HTTP), File Transfer Protocol (FTP), Domain Name System (DNS), etc.). However, packet inspection requires significant processing resources that can increase network latency.

In virtualized networks in particular, security and authorization for network requests to and from the guest machines becomes increasingly complex and difficult. Virtual hosting networks often have multiple entry points to the network, increasing the need for security and authorization at each of the end machines. In some cases, virtualized environments rely on firewall rules defined in a network policy to protect networks from malicious traffic.

In some cases, network policies are defined based on contexts for various network requests made in the network. Context-based authorization, such as an identity firewall, allows an administrator in a network to allow or disallow connections based on the context (e.g., the identity of a user and/or application) of the request, rather than simply based on ports and addresses of the packets. The identity firewall allows connections and communications between end machines in the network to be monitored and managed based on the identities of the users and/or applications. For example, in some cases, connections from a particular machine to a server may be allowed from certain applications or by certain users, while not from others.

One of the challenges in today's hosting system networks is providing efficient and secure context-based authorization for virtual machines operating on host machines in a network. In many cases, the hosting system networks lack sufficient information to make allow/block enforcement decisions for the network requests. In some situations, a malicious application can break the security policies of a network by generating network events as though they are being performed by a genuine user or application.

BRIEF SUMMARY

Some embodiments provide a novel method for authorizing network requests for a machine in a network. In some embodiments, the method is performed by security agents that execute on guest virtual machines operating on a host machine. In some embodiments, the method captures a network request (e.g., network control packets, socket connection request, etc.) from a primary application executing on the guest machine and identifies a context for the network request.

The context of some embodiments includes information about the network request that is made, as well as information about the applications or users that initiated the network request. In some embodiments, the context includes not only the application that sends the network request, but also a second application, such as a plugin or secondary application that causes the first application to make the network request. The method of some embodiments identifies the second application by performing a stack walk through the call stack of the machine. In some embodiments, in addition to or instead of the application IDs, the context includes a first and second user. For example, in some cases a particular user may execute a process or thread while impersonating another user. The context of some such embodiments includes two tokens for both the impersonated user and the logged-in user.

The method then analyzes the network request and the identifications of the first and second applications (and/or identifications of first and second users) to determine whether to allow the network request. In some embodiments, a security agent operating on a guest machine analyzes the network requests by sending the network request and the context for the request to a security engine operating on the host machine. The security engine of some embodiments performs authorizations for the network requests of all of the guest virtual machines operating on the host machine.

In some embodiments, the security engine is one of many security virtual machines that operate on the host machine. Security virtual machines in some embodiments provide third-party security services (e.g., authorization, encryption, malware detection, anti-virus, etc.) through secured virtual machines that operate on the host machine. In some embodiments, the security virtual machines communicate with the security agents through a standardized protocol.

In some embodiments, the security engine enforces security policies for the network. The security policies are defined based on the identified context (e.g., application and/or user identifications), allowing an administrator to restrict network requests at a fine-grained level. The security engine of some embodiments makes authorization decisions for the network requests based on the application and/or user identifications of the context received from the security agent, as well as on a type of the network request. In some embodiments, the network request is associated with access to a network location or file, and the decision of whether to allow the access is based on system permissions for the user and/or the application that requests the access. The security engine then responds with the authorization decision, which the security agent on the machine uses to allow or reject the captured network request.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
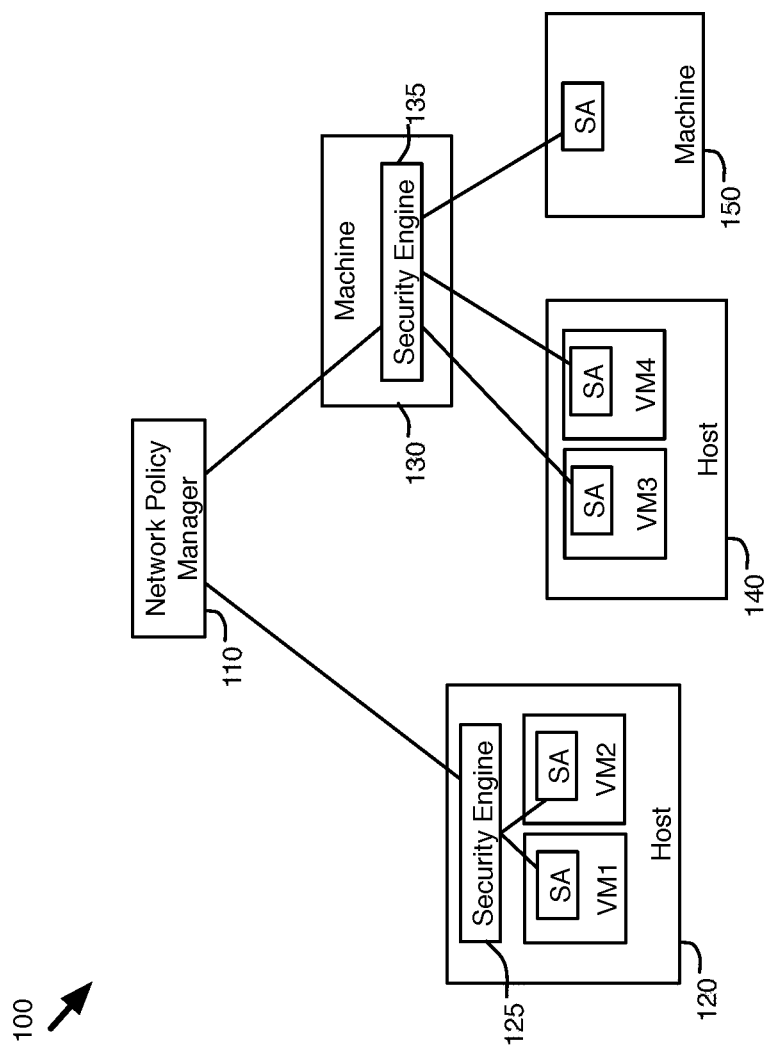
FIG. 1 illustrates an example of an authorization system that uses extended context information to enforce security policies for various machines in a network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for authorizing network requests for a machine in a network. In some embodiments, the method is performed by security agents that execute on guest virtual machines operating on a host machine. In some embodiments, the method captures a network request (e.g., network control packets, socket connection request, etc.) from a primary application executing on the guest machine and identifies a context for the network request.

The context of some embodiments includes information about the network request that is made, as well as information about the applications or users that initiated the network request. In some embodiments, the context includes not only the application that sends the network request, but also a second application, such as a plugin or secondary application that causes the first application to make the network request. The method of some embodiments identifies the second application by performing a stack walk through the call stack of the machine. In some embodiments, in addition to or instead of the application IDs, the context includes a first and second user. For example, in some cases a particular user may execute a process or thread while impersonating another user. The context of some such embodiments includes two tokens for both the impersonated user and the logged-in user.

The method then analyzes the network request and the identifications of the first and second applications (and/or identifications of first and second users) to determine whether to allow the network request. In some embodiments, a security agent operating on a guest machine analyzes the network requests by sending the network request and the context for the request to a security engine operating on the host machine. The security engine of some embodiments performs authorizations for the network requests of all of the guest virtual machines operating on the host machine.

In some embodiments, the security engine is one of many security virtual machines that operate on the host machine. Security virtual machines in some embodiments provide third-party security services (e.g., authorization, encryption, malware detection, anti-virus, etc.) through secured virtual machines that operate on the host machine. In some embodiments, the security virtual machines communicate with the security agents through a standardized protocol.

In some embodiments, the security engine enforces security policies for the network. The security policies are defined based on the identified context (e.g., application and/or user identifications), allowing an administrator to restrict network requests at a fine-grained level. The security engine of some embodiments makes authorization decisions for the network requests based on the application and/or user identifications of the context received from the security agent, as well as on a type of the network request. In some embodiments, the network request is associated with access to a network location or file, and the decision of whether to allow the access is based on system permissions for the user and/or the application that requests the access. The security engine then responds with the authorization decision, which the security agent on the machine uses to allow or reject the captured network request.

An overview of the process for authorizing network requests using secondary information for machines in a network has been described above. Further details and examples of the authorization system and the authorization process are described below. Specifically, Section I describes a system for authorizing network requests using a security engine and a group of security agents that operate on machines in the network. Section II then describes the process and different examples of authorizing network requests using extended context information through the authorization system. Section III then describes an electronic system with which some embodiments of the invention are implemented.

I. Authorization System

FIG. 1 illustrates an example of an authorization system that uses extended context information to enforce security policies for various machines in a network. The authorization system 100 includes a network policy manager 110, hosts 120 and 140, and server machines 130 and 150. The network policy manager communicates with various security engines 125 and 135 to enforce network policies, such as firewall rules, for the various end machines (i.e., virtual machines VM1-VM4, machine 150), which each executes a security agent (SA). The security agents use the security engines 125 and 135 to authorize network requests of the end machines in the authorization system 100.

The network policy manager 110 is for managing network policies for communications between end machines in a network. In some embodiments, a network administrator uses the network policy manager 110 to define a network policy that determines firewall rules and other security settings that can be pushed to the security engines 125 and 135 in the network. The centralized network policy manager 110 of some embodiments operates on a separate centralized network policy management server, while in other embodiments, the centralized network policy manager shares a physical server with guest virtual machines of the network.

The network policy manager 110 of some embodiments communicates with security engines 125 and 135 in the authorization system 100 to distribute and enforce the network policy. The security engines of some embodiments receive firewall rules and other network security settings and use the received security information to authorize network requests made by security agents operating on the end machines.

In this example, security engine 125 operates on a host machine 120, along with virtual machines (VMs) VM1 and VM2. The security engine 125 is a security appliance running on a dedicated secure virtual machine (SVM) that provides protection to all virtual machines on the host machine 120. Security engine 135 operates on another machine 130, and unlike security engine 125, operates on a separate machine from the security agents for VM3, VM4, and machine 150, for which it provides authorization services. In this example, security engine 135 is a dedicated security appliance (e.g., a server or other hardware device), which receives authorization requests from security agents operating on both virtual machines VM3 and VM4, as well as a bare-metal machine 150.

The security engines 125 and 135 of some embodiments are third party applications or appliances that communicate with the security agents through a standardized Application Programming Interface (API) (e.g., EPSec). The communication protocol allows the security agents to monitor file and network activity on the guest machines and to communicate the information to the third party security engines. The security engines 125 and 135 are described in further detail below with reference to FIG. 3.

Each end machine executes a security agent (SA) that communicates with a corresponding security engine to authorize various network requests of the virtual machines. The end machines include virtual machines VM1 and VM2. A virtual machine is managed by virtualization software executing on a physical host machine. Virtualization software can also manage additional virtual machines. Virtualization software can be native or hosted, and manages one or more virtual machines, permitting multiple concurrent instances of operating systems on the same computer hardware resources.

Each of the end machines also executes various applications for an end user of the guest machine. In some embodiments, applications operating on the end machines send network socket event requests. A network socket is an endpoint with a local address and local port. A resulting network connection includes a source IP, source port, protocol, destination IP, and destination port. Connection-oriented sockets such as Transmission Control Protocol (TCP) sockets may have a connection state, though not connectionless sockets such as User Datagram Protocol (UDP) sockets. A network socket event request may be a status change in a network socket, for example requested UDP or TCP events such as network open, network close, and listen.

When the applications (or the system) of the end machines make network requests, the security agents operating on the various end machines VM1-VM4 and machine 150 capture the network requests and authorize the requests with the security engines 125 and 135 before performing (or allowing) the network request for the end machine. In some embodiments, the security agent is a thin agent (e.g., Transport Driver Interface (TDI), Windows Filtering Platform (WFP), Netfilter, Winsock, etc.) that operates between layers of the network protocol stack on the end machines.

The security agents of some embodiments intercept file system and network calls and deliver them to the security engines for processing. The security engine makes a decision on the calls and provide the decision back to the security agents, which take action on the calls based on the received decision.

Figure 2:
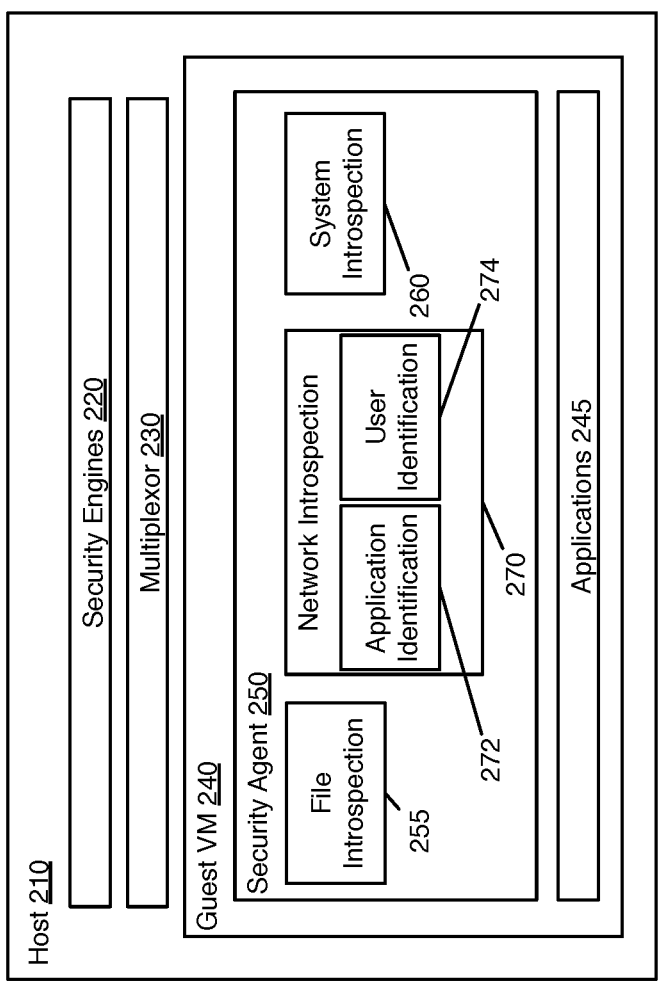
FIG. 2 illustrates an example of a security agent operating in a guest VM on a host machine.

FIG. 2 illustrates an example of a security agent operating in a guest VM on a host machine. The host machine 210 includes security engines 220, a multiplexor 230, and a guest VM (or end machine) 240. Guest VM 240 includes the security agent 250 and various applications 245 that operate within the operating system of guest VM 240. Although shown with a single guest VM 240 for this illustration, it should be understood that a host machine 210 could host several guest VMs, with each guest VM operating a security agent and application.

The security agent 250 of some embodiments acts as a thin agent between the applications and a network layer (e.g., a socket layer) of an operating system (OS) of the guest VM, in order to capture network requests made by the applications before allowing them to be processed by the OS. The security agent 250 of some embodiments may be may be implemented as a computer program that runs in the background, as a service or daemon within the operating system of the guest VM 240.

For example, Windows provides documented APIs to hook the Winsocket socket calls used by all the network applications in user mode. Winsock Service Provider Interface (SPI) functions allows the winsocklsp Dynamic Link Library (DLL) module to layer in-between the Windows socket layer and the applications. All the socket calls can be replaced by user-defined functions, which can do custom processing before actually invoking the Winsock calls. By registering a Winsock Layered Service Provider (LSP) at the top of the layered chain of LSPs, the applications will directly invoke the socket calls exposed by the LSP Dll. Socket calls "connect", "listen", "accept" and "closesocket" can be replaced to implement the functions (e.g., authorization, anti-virus, etc.) of the security agent.

In addition to capturing network requests of the system and applications, the security agent 250 of some embodiments monitors and collects context information (e.g., application, system, file, and user information) associated with the network requests. The security agent 250 of some embodiments uses the context information to make authorization decisions for the network requests.

As shown, the security agent 250 includes a file introspection module 255, a system introspection module 260, and a network introspection module 270. The file introspection module 255 and the system introspection module 260 of some embodiments are used to monitor system functions and access to files by applications that attempt network access. The file and system introspection modules and 255 and 260 of some embodiments are also used to monitor the system to collect information used for malware detection and other security functions. The network introspection module 270 captures the actual network requests and identifies information regarding the calling applications and/or users associated with each request.

In some embodiments, the various introspection modules communicate with each other to monitor and collect context information to be used to authorize network requests. For example, the network introspection module 270 of some embodiments passes the identity (e.g., the process identifier) of a calling application to the security agent 250, which provides the application ID to the file introspection module 255 with a request that the file introspection module 255 detect the application's access to each file and notify the security agent 250 of each detected access. The file introspection module 250 uses filters that it sets in the guest VM's 240 file system to identify any access of the identified application to all files or certain files (e.g., files of a particular category, such as non-system files, or data files) that are managed by the file system. In some embodiments, the file access information is included as part of the context for a network request, and is used to authorize the network request.

In some embodiments, the network introspection module 270 is called by the guest VM's TCP/IP stack each time the stack initiates or terminates a connection request. Through these calls, the network introspection module 270 captures (1) every new connection request that is made by applications 245 operating on the guest VM 240, and (2) contextual information (e.g., user identity, application context, etc.) for the new connections. As opposed to other solutions that perform deep packet inspection on every packet of the end machines, the network introspection module 270 of some embodiments only inspects packets to determine whether they are network connection packets, allowing other packets to pass through, minimizing the impact on the performance of the system. The network introspection module 270 enables the gathering of this information without the need to do costly deep packet introspection on the received guest VM data messages.

In some embodiments, the user and/or the application that initiates a particular network request is not the primary user/application associated with the network request, but rather a secondary user or application (e.g., a secondary application DLL operating within an application, a secondary driver that makes kernel system calls, a secondary logged-in user impersonating another user, etc.). In some cases, a network administrator may wish to restrict the secondary user or application, even when they are legitimately operating behind a primary user or application. In other cases, the secondary user or application is malicious and is attempting to circumvent the established network policies by masquerading as the primary caller.

The network introspection module 270 of some embodiments provides extended context information to allow network policies to be defined based on identifications of both the primary and secondary callers of the network request. By providing the extended context information, the network introspection module 270 of some embodiments is able to detect secondary malicious callers (e.g., applications, users, etc.). In this example, the network introspection module 270 includes an application identification module 272 and a user identification module 274 for identifying extended context information for a network request.

The application identification module 272 in some embodiments provides information about the primary and secondary applications associated with each network request of the applications 245. The application identification module 272 of some embodiments identifies the primary and secondary network-accessing applications when it initially detects an attempted network access. In some embodiments, the application identification module 272 also provides additional application information, such as the name of the process, application hash, publisher, etc.

In some embodiments, the application identification module 272 identifies a secondary application by performing a stack walk on the call stack of the guest VM 240 to get to the previous stack frame. From the address of the instruction pointer, the application identification module 272 retrieves the module name in the process space which invoked the network request. This can be a DLL name running in the process or the process itself. In some embodiments, the security agent 250 passes the extended module name and the address from which the call is invoked to the security engines 220 so that the security engines 220 can deduce whether the network connection should be allowed or denied based on the network policies. Below is a sample callstack to show a browser plugin making a TCP connection within the browser process space:

ChildEBP RetAddr
04ccf860 76cacb05 WS2_32!connect
04ccf860 76cacb05 WinsockLSP!LSPconnect
04ccf934 76ca3575 malicious!ICAsyncThread::CreateSelectSocket+0x228
04ccfc94 77a49ef2 KERNEL32!BaseThreadInitThunk+0xe
04ccfcd4                                    77a49ec5 ntdll_77a10000!_RtlUserThreadStart+0x70
04ccfcec                                    00000000 ntdll_77a10000!_RtlUserThreadStart+0x1b Based on the sample callstack, the application identification module 272 passes the return address "76cacb05" to the security engines 220. All the modules and their loaded address space is passed to the security engines 220 as part of the network event. With this information, security engines 220 can figure the module name (i.e., the DLL) from which the connection is initiated and, depending on the network policy, it can allow or deny the connection.

In some embodiments, the application identification module 272 also captures system requests made from the kernel of guest VM 240. In order to improve performance, many newer applications (e.g., Microsoft Internet Information Services (IIS) server, Windows Remote Desktop Protocol (RDP) server and Microsoft Server Message Block (SMB) server, etc.) use kernel sockets. When a significant number of drivers initiate network connections at the kernel, tracing the exact driver associated with each request gets complicated. Network connections can be made from the kernel mode using TDI clients or Winsock kernel. A malicious application can install a kernel mode driver to bypass the firewall rules based on process name. Since the drivers run as part of the kernel process, the network connections are seen as part of the system process.

In some embodiments, the application identification module 272 detects network connections initiated by the kernel and performs a stack walk on the call stack to identify a driver that initiates each network connection. For example, in Windows XP and above, a driver can make network connections at the kernel by sending TDI requests directly to the TCP driver. Starting from Microsoft Vista, Microsoft provided the Winsock kernel similar to the API calls in user mode. The current TDI filter, which is used at the kernel to sniff all the network connections, can be extended to perform a stack walk to fetch the driver information from which TDI request is generated.

In some cases, when a kernel driver sends a network connection request, the application identification module 272 identifies the corresponding system file name and path. This information of the driver and its associated path has to be sent to databases on the security engines 220 to provide precise information regarding the specific kernel component which was responsible for generating the event.

The security agent 250 also includes a user identification module 274 that identifies the primary and secondary users associated with each network request. The user identification module 274 of some embodiments can precisely identify which user initiated the connection, including the Active Directory (AD) groups of which the user is a member. For instance, if different users from the Finance and Human Resources groups of an enterprise are logged in on a terminal server, the user identification module 274 can identify which user from which group initiated a particular network connection.

In some embodiments, roles and other directory information for the identified users is retrieved by the security engines 220. In some such embodiments, the user identification module 274 passes primary and secondary user information to the security engines, which access a directory (e.g., Active Directory, etc.) to identify directory information (e.g., roles, groups, domains, etc.) for the primary and secondary users, and uses the directory information in conjunction with the defined network policies to make authorization decisions for network requests.

Once the introspection modules of the security agent 250 have captured a network request and collected the extended context information for the request, the security agent 250 of some embodiments uses a multiplexor 230 to send the network request and the extended context information to the security engines 220. In some embodiments, the introspection modules 255, 260, and 270 provide the gathered information to the multiplexor 222 through a VM communication interface (e.g., the VMCI interface of VMware Inc.).

In some embodiments, the multiplexor 230 provides different information to the different security engines based on the functions of each security engine. The security engines 220 of some embodiments include several third-party security virtual machines (SVMs) or applications that perform specialized security functions for end machines on the network.

In some embodiments, the security engines 220 examine security policies and rules for the network to determine whether the network request should be allowed or rejected. The security engines 220 then provide the determination back to the security agent 214, which processes (i.e., discards or performs) the network request.

Figure 3:
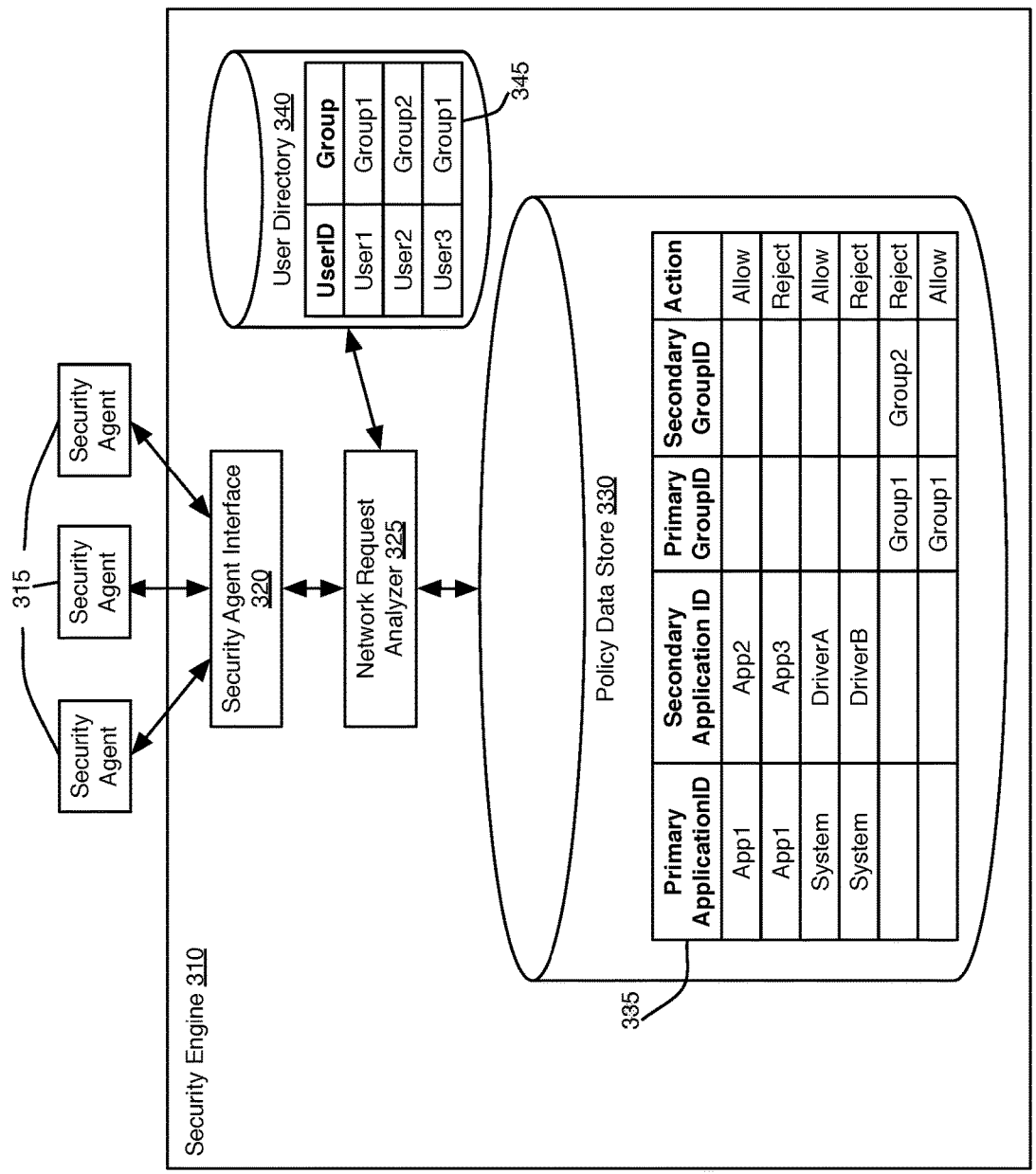
FIG. 3 illustrates a security engine for authorizing network requests from various machines.

FIG. 3 illustrates a security engine for authorizing network requests from various end machines in a network. The security engine 310 includes a security agent interface 320, a network request analyzer 325, a policy data store 330, and a user directory 340. The security engine 310 is for authorizing network requests received from the security agents 315 of end machines (not shown).

The security engine 310 communicates with the various security agents 315 through the security agent interface 320, receiving and sending network requests and authorization decisions. The security agent interface 320 of some embodiments uses an API (e.g., EPSec) to translate the received network request and context information to a format that is usable by various third-party security engines.

The network request analyzer 325 processes the received network requests and the extended contexts for the requests. The network request analyzer 325 analyzes the context information for each request to determine whether to authorize the request based on defined network policies and user permissions.

The network request analyzer 325 of some embodiments uses multiple data sources to determine whether a network request is allowed or rejected. In this example, the network request analyzer 325 access a policy data store 330 to access rules defined for a network policy, and a user directory 340 that provides information about the users (e.g., roles, groups, domains, etc.) to be used for determining whether the network request should be authorized. In some embodiments, the user directory 340 is located on a separate machine and accessed through a network.

The security policies and rules stored in the policy data store 330 of some embodiments are defined based on the extended context (e.g., primary and secondary identities of the user and/or the application) that initiates the network request at the guest VM. In some embodiments, the security agents 315 send primary and secondary user information, which is used to identify associated roles and groups for the primary and secondary users through lookups performed on the directory 340. In some such embodiments, the network policies stored in the policy data store 330 are defined based on the identified user groups or roles, allowing an administrator to clearly define and maintain permissions for several users in the network.

The policy data store 330 stores rules for authorizing network requests based on the context of each request. In this example, the policy data store 330 includes a rules table 335, with rules defined based on primary and secondary identifications for applications and groups. The rules table 335 of some embodiments is populated by a centralized network policy manager, which maintains the network policy and provides the necessary portions of the network policy to the security data store 330 of each security engine 310. Each rule of the rules table 335 identifies different sets of attributes for the network request, as well as an action (i.e., allow, reject) for the rule. In some embodiments, the policy data store 330 uses additional context information (e.g., network request type, protocol, application type, etc.) to define network policies.

II. Monitoring Network Requests

Figure 4:
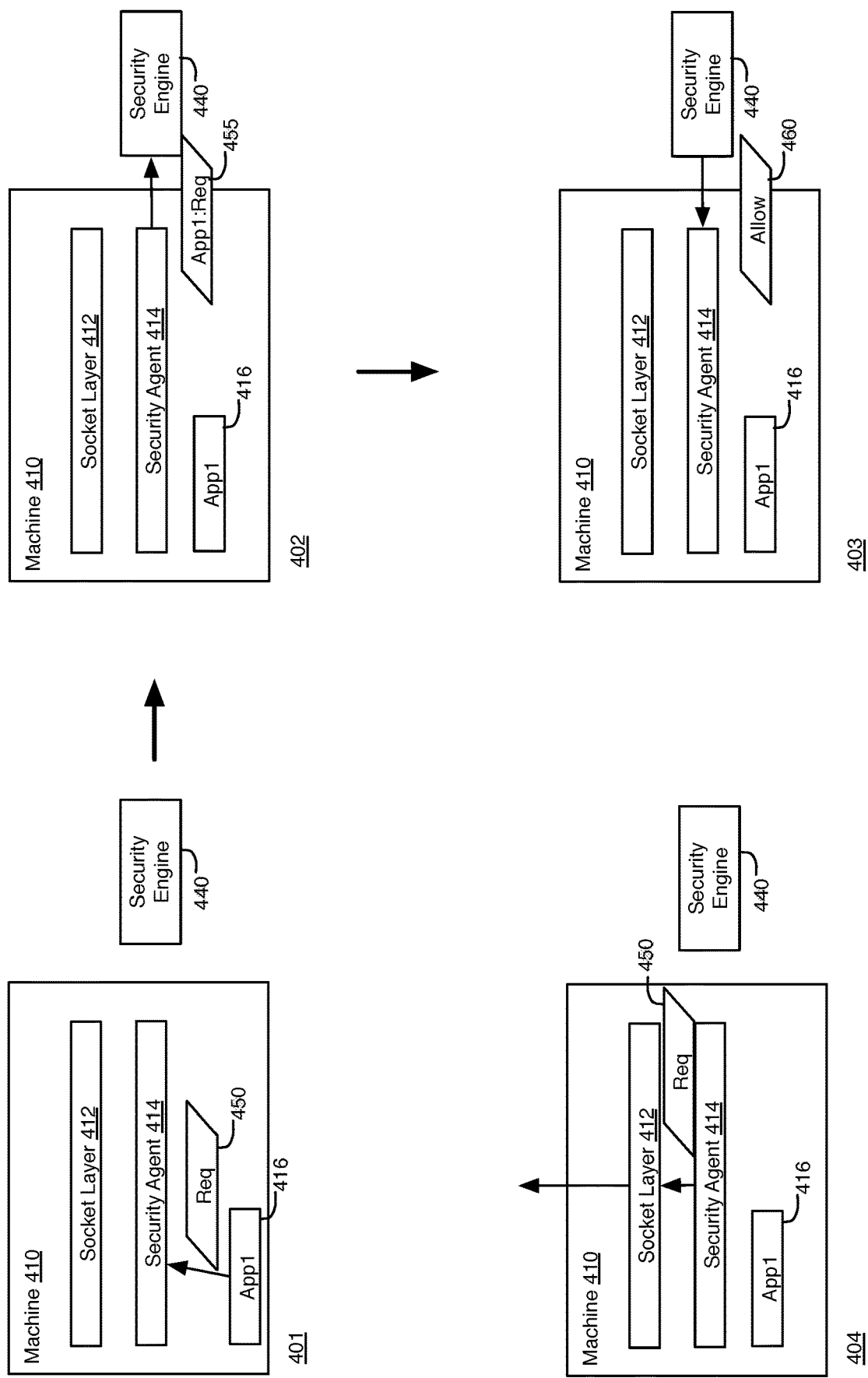
FIG. 4 illustrates an example of authorizing network requests for a machine in a network.

FIG. 4 illustrates an example of authorizing network requests for a machine in a network in three stages 401-403. This example shows a machine 410 that makes network requests and a security engine 440 for authorizing the requests based on the context of each request.

The machine 410 includes a socket layer 412, a security agent 414, and an application App1. The machine 410 of some embodiments is a virtual machine operating on a host machine (not shown) in a network, where the host machine uses a hypervisor to host multiple virtual machines. In some embodiments, the hypervisor of each host machine provides a security agent to handle the network requests of all of the virtual machines operating on the host machine. The security agent 414 of some embodiments captures (1) every new connection request (e.g., both incoming and outgoing connection requests) and (2) contextual information (e.g., user identity and application context) for the new connections.

In this example, the first stage 401 shows that application 416 sends a socket connection request 450 to the security agent 414. In some embodiments, the socket connection request 450 is a request for a webpage or for other remote resources on a server computer. In some embodiments, the connection request 450 includes an application identification (ID) that identifies the calling application.

The security agent 414 of some embodiments captures all network requests generated by applications and users on the guest VM. The security agent 414 then determines whether the request should be allowed, before either creating the connection or discarding the request.

In order to provide the necessary information to make the authorization decision, the security agent 414 of some embodiments identifies extended context information for the network request 450. The context information of some embodiments includes information related to the network request, such as primary and secondary IDs for the calling application and/or user. The primary and secondary IDs allow the security engine to enforce network policies that can identify malicious or impersonated applications or users.

In the second stage 402, the security agent 414 sends request information 455 to security engine 440 to authorize the network request. The request information 455 of some embodiments includes the collected context information (e.g., ID for the calling application "App1"), as well as the network request.

In the third stage 403, the security engine 440 makes an authorization decision based on the network request and the associated context information and sends a decision 460 back to the security agent 414.

The fourth stage 404 shows that, based on the allow decision 460 received from the security engine 440, the security agent 414 sends the connection request 450 to the socket layer 412 to initiate a socket connection.

Figure 5:
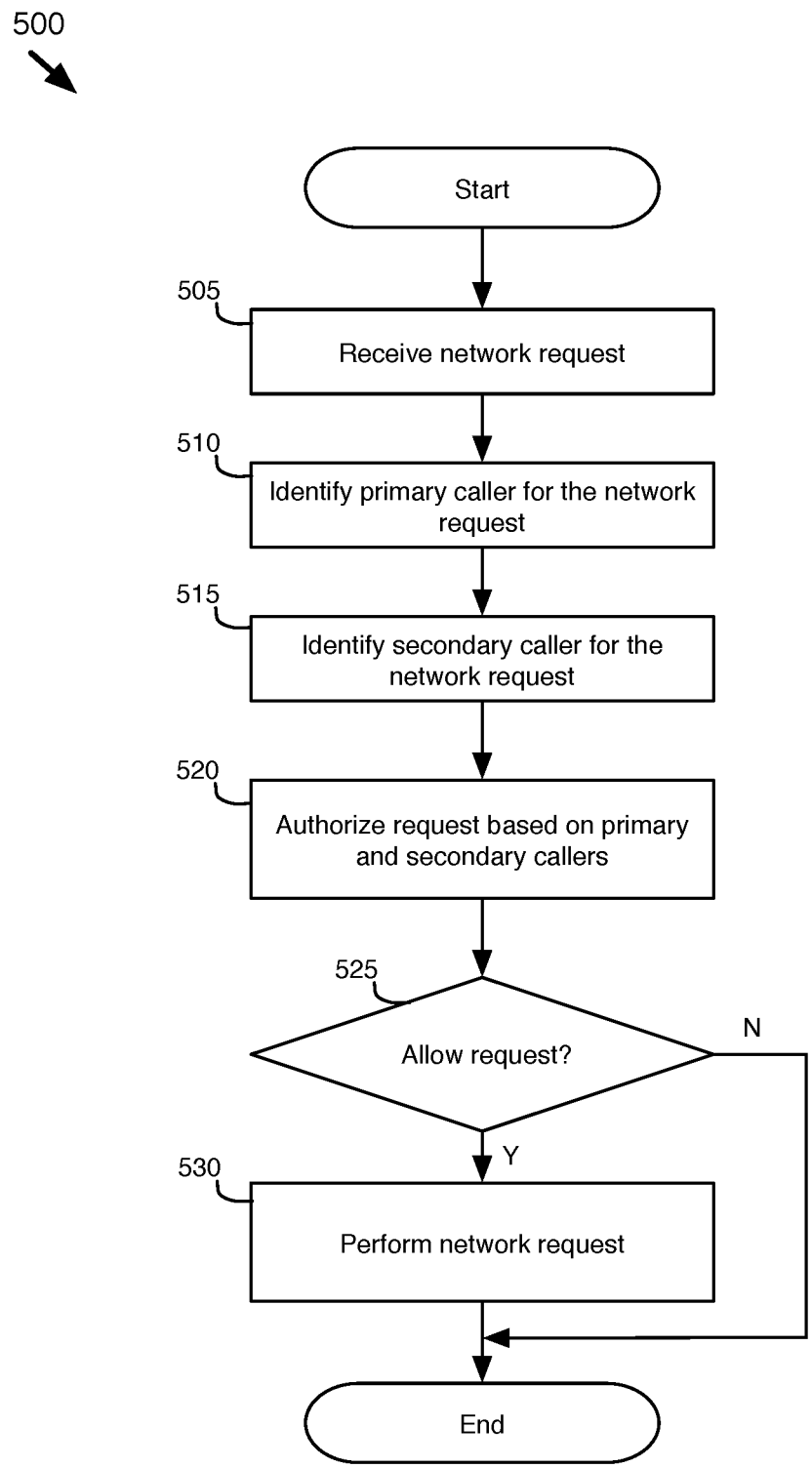
FIG. 5 conceptually illustrates a process for monitoring network requests for a machine in a network.

FIG. 5 conceptually illustrates a process for monitoring network requests for a machine in a network. In some embodiments, the process 500 is performed by a security agent operating on each guest VM on a host machine. The process 500 begins by receiving (at 505) a network request from an entity operating on the guest VM. The network request may be received from an application or a system kernel of the guest VM. The process 500 then identifies (at 510) a primary caller for the network request. The primary caller of some embodiments is the actual application and/or user directly associated with the network request. In some cases, the primary caller is the system kernel.

The process 500 then identifies (at 515) a secondary caller for the network request. In some embodiments, the network request can be initiated by a malicious program that causes a whitelisted program to send a network request. By identifying the secondary caller, authorization decisions can be made based on both the primary and secondary callers, providing the security engine with a more complete context for the network request.

The process 500 then authorizes (at 520) the network request based on the primary and secondary callers. The process 500 of some embodiments analyzes a type for the network request (e.g., socket connection request, etc.), as well as the identifications of the primary and secondary callers to determine whether to authorize the network request. In some embodiments, the process 500 analyzes a combination of primary and secondary identifications for both applications and users (or roles and groups assigned to the users) to authorize a network request.

In some embodiments, the authorization is performed by a security engine that operates separately from the security agent that captures the network requests. In some such embodiments, the security engine operates in a hypervisor of a host machine and authorizes network requests for all of the VMs operating on the host machine. Security engines are described in further detail above with reference to FIG. 2.

The process 500 then determines (at 525) whether the network request has been allowed or rejected. When the process 500 determines (at 525) that the network request is not allowed, the process 500 ends. When the process 500 determines (at 525) that the network request is allowed, the process 500 performs (at 530) the network request (e.g., initiates a socket connection), and then ends.

Figure 6:
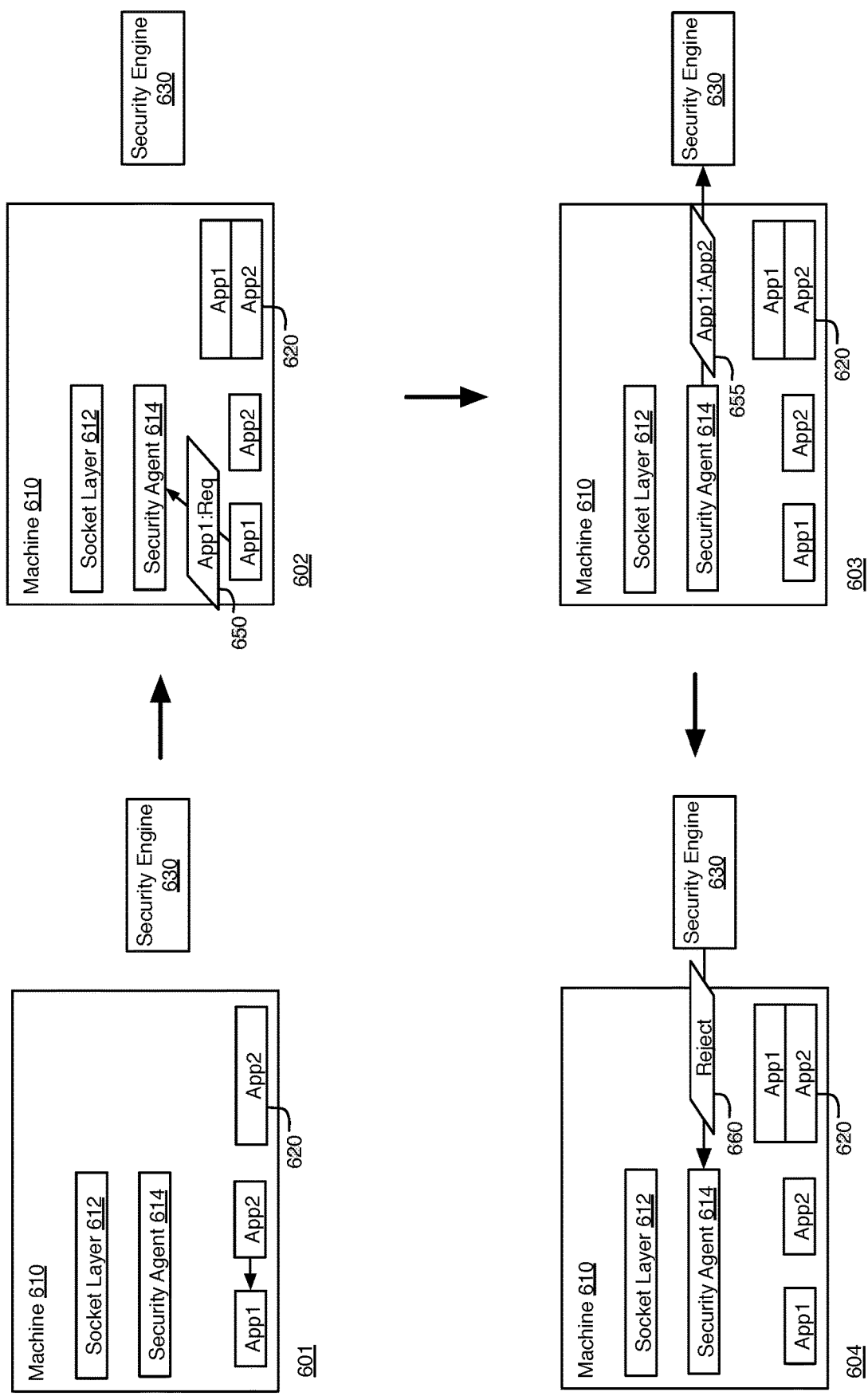
FIG. 6 illustrates an example of providing secondary information for authorization of network requests for applications operating on a machine.
Figure 7:
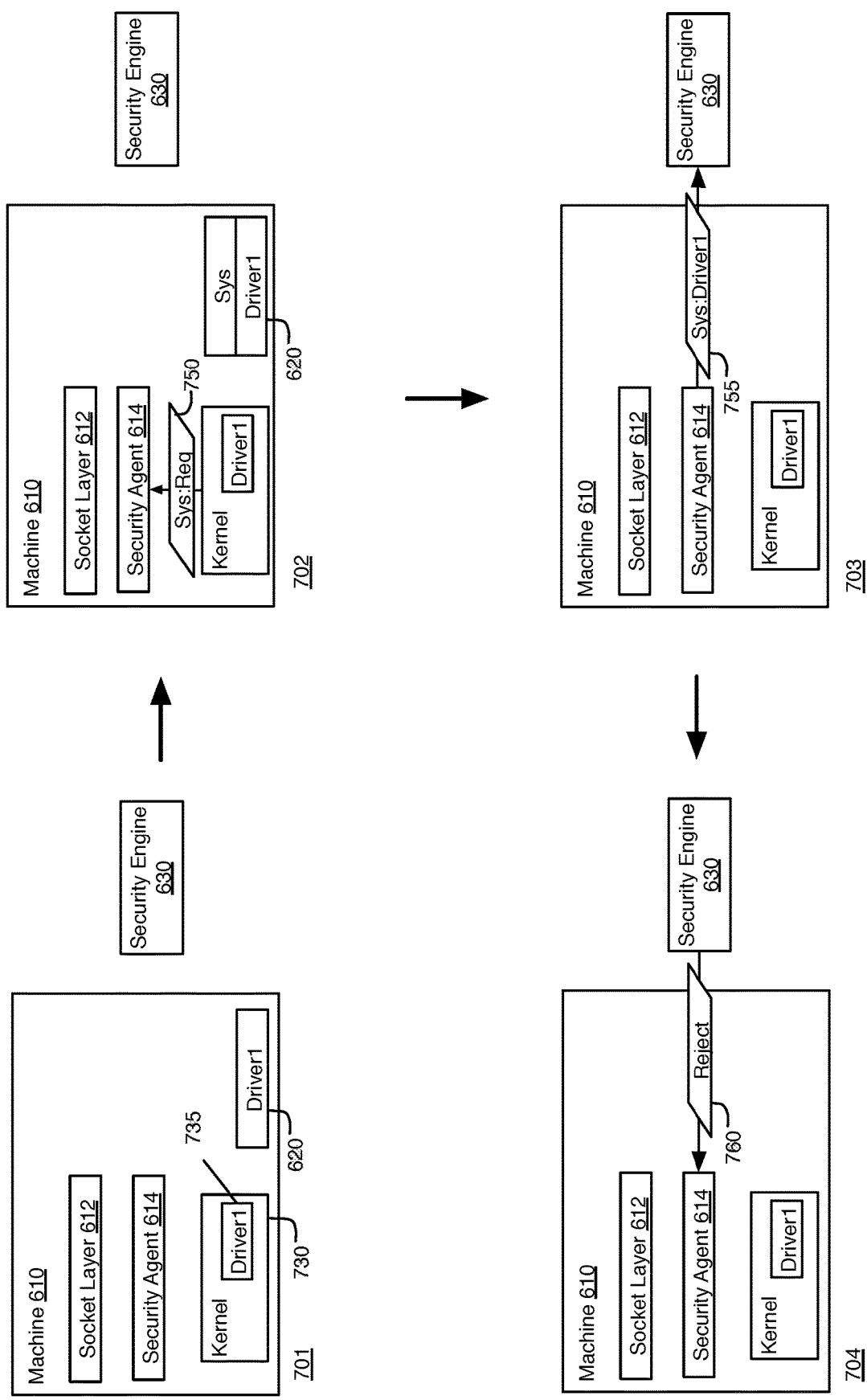
FIG. 7 illustrates an example of providing secondary information for authorization of network requests for system requests from the system kernel of a machine.
Figure 8:
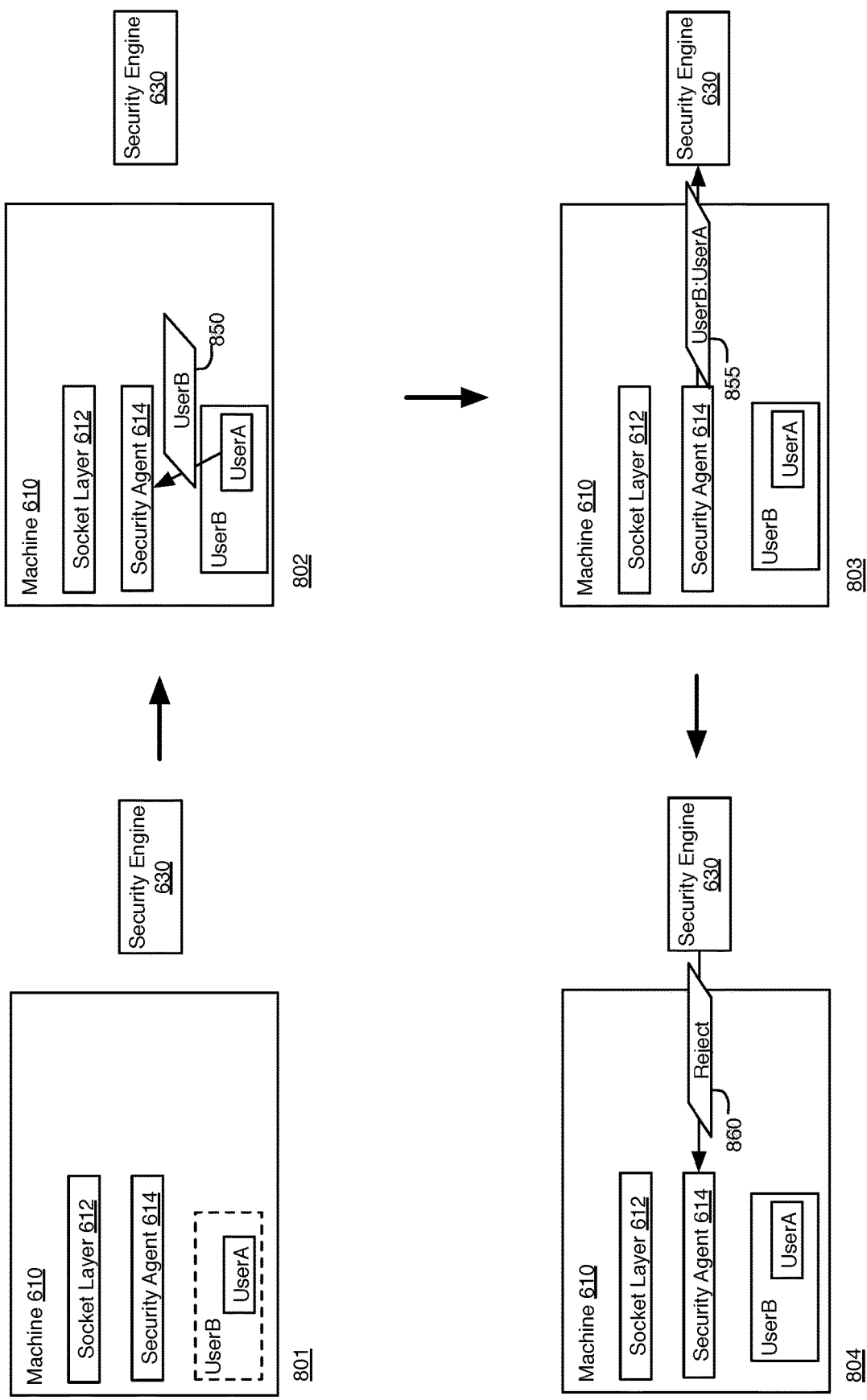
FIG. 8 illustrates an example of providing secondary information for authorization of network requests for impersonated users.

FIGS. 6-8 illustrate different examples of providing extended context information for authorizing network requests. FIG. 6 illustrates an example of providing secondary information for authorization of network requests for applications operating on a machine in four stages 601-604. Like the example of FIG. 4, this example shows a security engine 630 and a machine 610 with a socket layer 612, security agent 614, and an application App1. In addition, FIG. 6 shows a second application App2 and a call stack 620.

The second application App2 may be any application that causes another application to initiate a network request. For example, in some embodiments, the second application App2 is a malicious application that writes code into the memory space of the allowed (or whitelisted) first application App1, and causes App1 to send a network request. The malicious application injects the malicious code into the genuine process so that the generated network event is reported as the genuine process. Similarly, a malicious application can also write execution code page within a process memory space and run a thread executing this code from a different process. With these two methods of code injection, malicious applications can covertly perform the network action by masquerading as a whitelisted or allowed application.

For example, many web browsers support plugins that run from the same browser process, usually as a Dynamic Link Library (DLL). In such an example, App2 is a plugin for a whitelisted application App1 that operates within the context of the whitelisted application. When a network event is generated from the malicious plugin DLL, the network connection appears to have been initiated by the whitelisted web browser process. In such cases, extended context information provides the security engines with the necessary information to prevent the malicious plugin from making network requests while masquerading as the whitelisted application.

In the first stage 601, the second application App2 sends a request or otherwise causes the first application App1 to send a network request to the socket layer 612 to create a socket connection to another machine, such as a server. However, when the second application App2 makes the request, an entry is made in the call stack 620. The call stack stores information about active processes operating on the machine 610, so when App2 makes the request to operate on App1, an entry for App2 is made on the call stack 620.

The second stage 602 shows that the first application sends a network request 650 toward the socket layer 612, which adds a second entry (for App1) to the top of the call stack 620. The second stage 602 also shows that security agent 614 intercepts the network request 650.

At this point, the network request 650 appears to have been sent by the whitelisted first application App1. However, the security agent 614 of some embodiments identifies a secondary application (i.e., App2) by performing a stack walk through the call stack 620. In some embodiments, the security agent 614 walks through the stack to identify an application or process that is at a layer immediately below the request from the first application.

The third stage 603 shows that the security agent 614 sends request information 655 to the security engine 630. The request information 655 of some embodiments includes context information (e.g., identifications for both the primary and secondary applications (App1 and App2), user information, system information, etc.) as well as information about the network request (e.g., source, destination, type, etc.). In some embodiments, the network request itself is sent to the security engine 630. The security engine 630 uses the request information 655, including the primary and secondary application information, to analyze and authorize the network request 650. In some embodiments, the security engine 630 maintains a whitelist of allowed application and verifies that both the primary and secondary applications are allowed to initiate a particular network request before allowing the particular network request.

The security engine 630 of some embodiments uses the primary and secondary application information to analyze and authorize the network request 650 according to established network policies. The security engine 630 of some embodiments maintains permissions for each application and verifies that both the primary and secondary application are authorized for each network request. In other embodiments, permissions are defined based on the primary and secondary application identifications. For example, in some cases, a particular application may only be authorized to make a particular network request when the particular application is operating as a primary application, or as a secondary application with a particular primary application.

As described above with reference to FIG. 3, the security engine 630 of some embodiments enforces a set of network policies through a set of rules for authorizing different operations of the guest VM. In this example, App1 is a whitelisted application, while App2 is an application that has been identified as malicious, so the network request is rejected.

In the fourth stage 604, the security engine 630 has analyzed the received network request 650, along with the identifications of the applications App1 and App2. The fourth stage 604 shows that the security engine 630 sends a rejection message 660 to the security agent 614, which then discards the network request 650 that was received from application App1.

In some cases, rather than masquerading as a whitelisted application, malicious code is used to initiate network requests as the kernel of the operating system of a machine. FIG. 7 illustrates an example of providing secondary information for authorization of network requests for the system kernel of a machine in four stages 701-704. Like the example of FIG. 6, this example shows security engine 630 and machine 610 with a socket layer 612, security agent 614, and call stack 620. Rather than applications, this figure shows a kernel 730 and a driver 735 operating within the kernel 730.

Driver 735 is one of many drivers that operate within the kernel 730 as part of the kernel process. When the drivers initiate network requests, the network requests are seen as part of the system process. If a malicious or faulty driver is installed within the kernel 730, it becomes difficult to manage the network requests initiated by the kernel without affecting the performance of the kernel.

In the first stage 701, the driver 735 initiates a network request in the kernel 730. As for the applications described above, an entry (Driver1) is made in the call stack 620 for the calling driver 735. The call stack stores various information about active processes operating on the machine 610, so when the driver makes the call, it gets stored on the call stack 620.

The second stage 702 shows that the kernel 730 sends the network request 750 to the socket layer 612 to create a socket connection to another machine, such as a server. This adds a second entry (for a system process) to the top of the call stack 620. The second stage 702 also shows that security agent 614 intercepts the network request 750.

At this point, the network request 750 appears to be a system request, initiated by the kernel 730. However, the security agent 614 of some embodiments identifies a secondary application (i.e., Driver1) by performing a stack walk through the call stack 620. In some embodiments, the security agent 614 walks through the stack to identify drivers or other modules that are identified at layers immediately below the request from the kernel 730.

The third stage 703 shows that the security agent 614 sends request information 655 to the security engine 630. In this example, the context information for the request information 755 identifies the request as a system request from the kernel 730, but also includes information on the calling driver 735 ("Driver1"). The security engine 630 uses the driver information to analyze and authorize the network request 650. In some embodiments, the security engine 630 stores the various system and driver requests and generates a whitelist of allowed drivers based on properties (e.g., name, path, hash value, etc.) of the calling driver. In some embodiments, a network administrator analyzes the driver requests to verify that network requests from particular drivers are to be allowed or rejected.

In the fourth stage 704, the security engine 630 has analyzed the received network request 750, along with the driver 735. The fourth stage 604 shows that the security engine 630 sends a rejection message 760 to the security agent 614, which then discards the network request 750 that was received from the system kernel 735.

The examples above describe capturing extended application contexts from the call stack of a machine. Alternatively, or conjunctively, the security agent of some embodiments captures primary and secondary user information to provide additional user information that can be used to make authorization decisions for network requests.

Operating systems allow threads in a process to run in a user context that differs from the original user who has logged into the machine. User-based access policies can be circumvented when a process is launched by a first user, but a thread inside the process impersonates as a second different user. Network policy decisions that are made based only on the process or thread token provides a gap where the application can circumvent policies. For example, suppose a user in a first role (e.g., nurse role) is blocked from using FTP, but users in a second role (e.g., doctor role) are allowed to use FTP. An application started by the nurse role can do a thread impersonation of a doctor's process token and can gain access to FTP.

FIG. 8 illustrates an example of providing secondary information for authorization of network requests for impersonated users in four stages 801-804. Like the example of FIG. 6, this example shows security engine 630 and machine 610 with a socket layer 612, security agent 614, and call stack 620. Rather than applications, this figure shows a user UserA.

User A operates processes and applications on the machine 610, which are not shown for simplicity. In some embodiments, when the user initiates a process or thread, the process is associated with the user's token. However, a user can impersonate another user, creating processes associated with the impersonated user's token.

In the first stage 801, the UserA is logged into the machine 610. Processes that initiate network requests would be associated with a token that identifies UserA. However, the first stage 801 shows that UserA impersonates UserB to begin a process.

In the second stage 802, the process initiated by UserA sends a network request 850 to the socket layer 612 to create a socket connection to another machine, such as a server. However, the network request 850 appears to have been sent by a process started by UserB, rather than UserA.

In order to provide a more complete picture of the user information, the security agent 614 of some embodiments identifies a secondary user (i.e., UserA) as a part of the context to be sent to the security engine 630. In some embodiments, the operating system makes the impersonated user token, along with the logged-in user's token, available to the security agent 614.

The third stage 803 shows that the security agent 614 sends request information 855 to the security engine 630. In this example, the context information for the request information 855 includes the process's primary token, as well as the impersonated token.

The security engine 630 uses the primary and secondary user token information to analyze and authorize the network request 850 according to established network policies. The security engine 630 of some embodiments maintains permissions for a single user and verifies that both the primary and secondary user are authorized for each network request. In other embodiments, permissions are defined based on the impersonated and primary user identifications. For example, in some cases, a particular user may not be authorized to make a particular network request, unless the particular user is impersonating a different authorized user. In some embodiments, the security engine 630 uses a directory (e.g., Active Directory) that defines roles and groups for the various users, allowing an administrator to define network policies based on the defined roles.

In the fourth stage 804, the security engine 630 has analyzed the received network request 850, along with the primary and secondary user tokens. The fourth stage 804 shows that the security engine 630 sends a rejection message 860 to the security agent 614, which then discards the network request 850 that was received from the process initiated by UserA.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
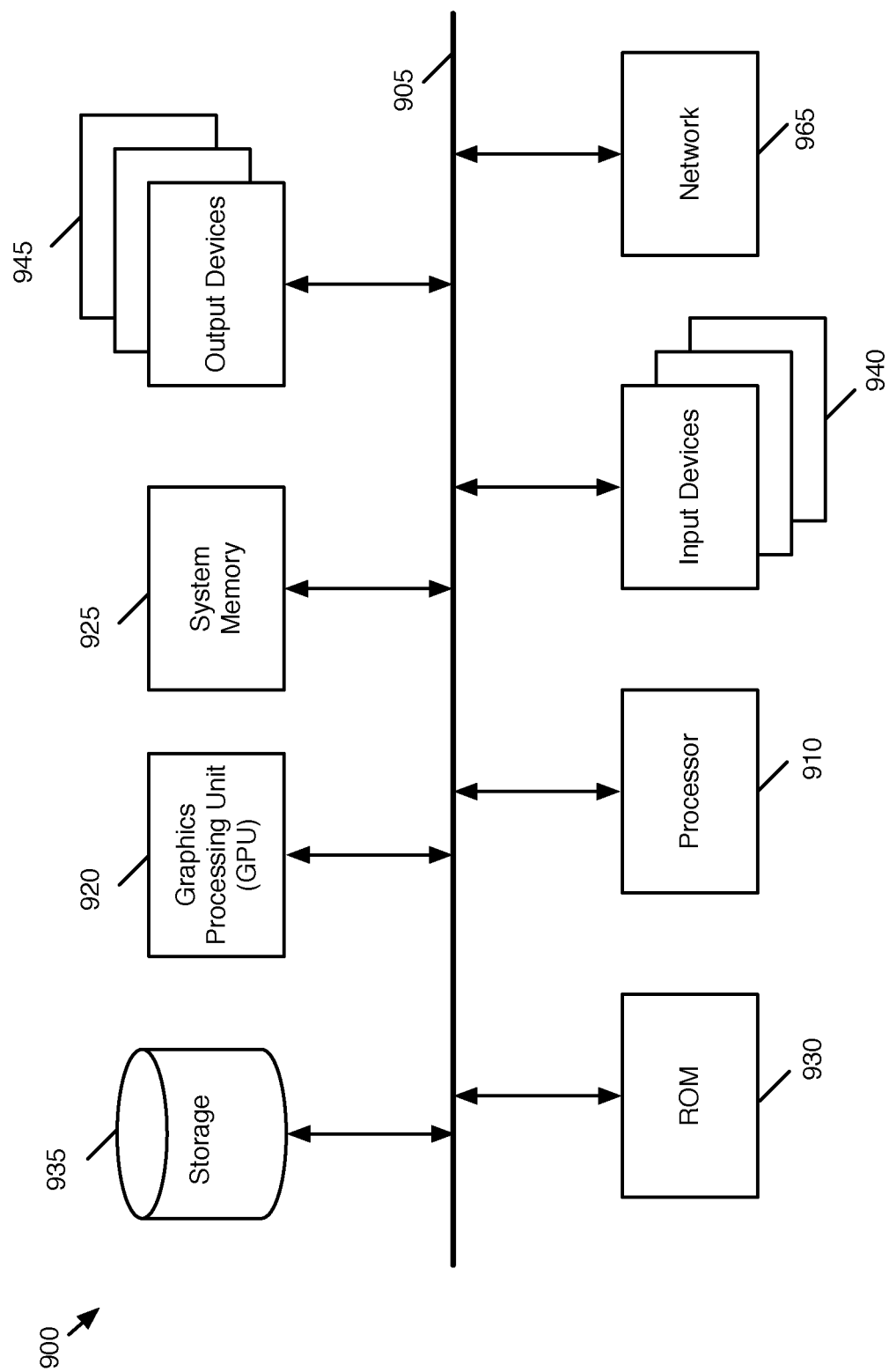
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A network authorization system comprising:
a set of processing units; and
a non-transitory machine-readable medium storing a program for a security agent which when executed by at least one processing unit manages network requests of an end machine in a network, the security agent one of a plurality of security agents operating on a plurality of end machines in the network, the program comprising sets of instructions for:
capturing a network request initiated by the end machine on which the security agent operates;
identifying contextual information for the network request and sending the contextual information to a security engine for enforcing a set of policy rules, the contextual information comprising at least a primary caller for the network request and a secondary caller for the network request;
receiving an authorization decision for the network request from the security engine, wherein the security engine determines whether both the primary caller and the secondary caller are allowed to initiate the network request; and
processing the network request according to the authorization decision.

2. The network authorization system of claim 1, wherein the network request is captured by a network introspection module of the security agent, the network introspection module called by a network protocol stack of the end machine each time the network protocol stack initiates or terminates a connection request.

3. The network authorization system of claim 1, wherein the set of instructions for identifying contextual information comprises a set of instructions for identifying, by a system introspection module of the security agent, system functions that the network request attempts to access.

4. The network authorization system of claim 1, wherein the set of instructions for identifying contextual information comprises a set of instructions for identifying, by a file introspection module of the security agent, files that the network request attempts to access.

5. The network authorization system of claim 4, wherein the file introspection module identifies the files using a set of filters on a file system of the end machine.

6. The network authorization system of claim 1, wherein the security engine enforces the set of policy rules by applying a set of firewall rules for the plurality of end machines, wherein the set of firewall rules specify whether to allow or disallow the network request based on the identified contextual information.

7. The network authorization system of claim 1, wherein the primary and secondary callers are applications operating on the end machine, wherein the identified contextual information comprises process identifiers for the applications.

8. The network authorization system of claim 1, wherein the primary and secondary callers are users of the end machine, wherein the identified contextual information comprises user identifiers.

9. The network authorization system of claim 1, wherein the contextual information further comprises at least one of a network request type, a network request protocol, and an application type.

10. The network authorization system of claim 1, wherein:
the security engine is one of a plurality of security engines in the network; and
a network policy manager manages a network policy for the network and sends network policy data to the plurality of security engines.

11. A method for a security agent managing network requests of an end machine in a network, the security agent one of a plurality of security agents operating on a plurality of end machines in the network, the method comprising:
capturing a network request initiated by the end machine on which the security agent operates;
identifying contextual information for the network request and sending the contextual information to a security engine for enforcing a set of policy rules, the contextual information comprising at least a primary caller for the network request and a secondary caller for the network request;
receiving an authorization decision for the network request from the security engine, wherein the security engine determines whether both the primary caller and the secondary caller are allowed to initiate the network request; and
processing the network request according to the authorization decision.

12. The method of claim 11, wherein the network request is captured by a network introspection module of the security agent, the network introspection module called by a network protocol stack of the end machine each time the network protocol stack initiates or terminates a connection request.

13. The method of claim 11, wherein identifying contextual information comprises identifying, by a system introspection module of the security agent, system functions that the network request attempts to access.

14. The method of claim 11, wherein identifying contextual information comprises identifying, by a file introspection module of the security agent, files that the network request attempts to access.

15. The method of claim 11, wherein the security engine enforces the set of policy rules by applying a set of firewall rules for the plurality of end machines, wherein the set of firewall rules specify whether to allow or disallow the network request based on the identified contextual information.

16. A non-transitory machine readable medium storing a program for a security agent which when executed by at least one processing unit manages network requests of an end machine in a network, the security agent one of a plurality of security agents operating on a plurality of end machines in the network, the program comprising sets of instructions for:
capturing a network request initiated by the end machine on which the security agent operates;
identifying contextual information for the network request and sending the contextual information to a security engine for enforcing a set of policy rules, the contextual information comprising at least a primary caller for the network request and a secondary caller for the network request;
receiving an authorization decision for the network request from the security engine, wherein the security engine determines whether both the primary caller and the secondary caller are allowed to initiate the network request; and
processing the network request according to the authorization decision.

17. The non-transitory machine readable medium of claim 16, wherein the network request is captured by a network introspection module of the security agent, that is called by a network protocol stack of the end machine each time the network protocol stack initiates or terminates a connection request.

18. The non-transitory machine readable medium of claim 16, wherein the set of instructions for identifying contextual information comprises a set of instructions for identifying, by a system introspection module of the security agent, system functions that the network request attempts to access.

19. The non-transitory machine readable medium of claim 16, wherein the set of instructions for identifying contextual information comprises a set of instructions for identifying, by a file introspection module of the security agent, files that the network request attempts to access.

20. The non-transitory machine readable medium of claim 16, wherein the security engine enforces the set of policy rules by applying a set of firewall rules for the plurality of end machines, wherein the set of firewall rules specify whether to allow or disallow the network request based on the identified contextual information.

* * * * *